Patented Mar. 29, 1932

1,851,664

UNITED STATES PATENT OFFICE

HENRY DREYFUS, OF LONDON, ENGLAND

PROCESS OF CONCENTRATING DILUTE ACETIC ACID

No Drawing. Application filed May 27, 1926, Serial No. 112,168, and in Great Britain June 26, 1925.

This invention has for its object the production of glacial or highly concentrated acetic acid from dilute acetic acids, especially from waste or dilute acetic acids resulting from the manufacture of cellulose acetate or from other manufacturing processes in which dulite or waste acetic acid liquors result.

In the manufacture of cellulose acetates in particular the recovery of the waste acid resulting from the process represents an important problem. Hitherto this recovery has usually been effected by neutralizing the acid to sodium acetate and reconverting this into glacial acetic acid. It has also been proposed to fractionate the dilute acid in copper columns in order to recover the acid in glacial or concentrated form. The first method involves complication and heavy expense in time, plant and labor, while the second method is very difficult, if not impossible, from a practical point of view, as on the one hand the acid attacks the apparatus very seriously, causing very great depreciation which renders the proposition uneconomical, and on the other hand the fractionating of the dilute acid has to be performed in big apparatus, is relatively slow and demands the expenditure of a great amount of steam and heat.

The present invention aims in particular to provide a process or processes whereby glacial or highly concentrated acetic acid can be produced or recovered more economically from dilute or waste acetic acids produced in the manufacture of cellulose acetates, or from any other dilute or waste acetic acids which it may be desired to transform into glacial or highly concentrated acetic acid.

For this purpose according to my invention I subject the dilute acetic acid or waste acetic acid to a process of reduction to acetaldehyde which is then transformed or worked up to glacial or concentrated acetic acid.

The reduction to acetaldehyde is effected by passing the dilute or waste acetic acid in a vaporized state, together with reducing gases such as hydrogen or gases containing hydrogen, for example water gas, town gas, producer gas or the like, in contact with heated catalysts or contact materials. Even carbon monoxide, or gases containing it either with or without hydrogen, may be employed for this reaction. The reducing gas or gases, for example hydrogen, may be employed in about the theoretically necessary proportion of one molecule per molecule of acetic acid or preferably in some excess over same, but I do not limit myself in this respect. As catalysts I may employ any suitable metals or substances such as are known to promote reduction reactions, for instance metals such as nickel, iron, zinc, tin, lead, silver, platinum, palladium, copper and so forth, or I may employ other substances or contact materials such for instance as pumice, glass-wool, sodium chloride and so forth; or mixtures of any of such catalysts and/or contact materials may be employed. The temperature at which the reaction is carried out may vary very considerably according to the catalyst or contact material employed or other conditions. With finely divided nickel for instance, temperatures between about 100° and about 400° C. may be chosen, but I in no way limit myself to these temperatures.

The aldehyde formed may be separated in any appropriate way from the mixture resulting from the reaction. This can be conveniently effected by fractional or other condensation, acetaldehyde having a low boiling point very distinct from that of water.

The conversion of the acetaldehyde into glacial or highly concentrated acetic acid may be performed by oxidation, according to any known or suitable process, with or without employment of catalysts.

Thus the recovery of the waste or dilute acid in glacial or highly concentrated form may be realized in an easy and economical way.

The oxidation of the acetaldehyde may however be omitted so as to obtain actealdehyde as the product of the process.

Further according to the invention, the acetaldehyde produced from dilute or waste acetic acids as above referred to, may be converted into keten, which may be recovered as such or used direct for acetylation purposes or may in turn be transformed into acetic anhydride or acetic acid or mixtures thereof, or mixtures of one or both of them with keten. Such production of keten and transformation of keten into acetic anhydride or acetic acid may be effected by methods or processes of the character indicated in the specification of my application for British Patent No. 16503 of 1925 or my U. S. patent application No. 112,170 of even date herewith. Or the aldehyde may be transformed into acetic acid or acetic anhydride or mixtures thereof or mixtures of one or both of them with keten, by subjecting it in vapor form, together with water vapors, or acetic acid vapors, or both said vapors, to the action of heat in presence or absence of catalysts, as likewise indicated in the specification of my said copending applications.

Corresponding to what is stated in my said specification, keten may be obtained by subjecting the acetaldehyde in vapor form, with or without pressure, to the action of hydrogen-splitting catalysts at a relatively high temperature. The reaction may be performed by passing the aldehyde vapors over heated catalysts, such for instance as nickel, zinc, copper or any other catalysts which have the property of splitting off hydrogen, at temperatures which should preferably not be higher than about 400° to 500° C. and preferably between about 150° and 300° C. The reaction may even be effected at higher temperatures without catalysts, however the reaction is not so favorable. Owing to its very low boiling point the keten formed may be readily separated from unconverted aldehyde, for example by cooling the reaction gases with a brines circulation or otherwise.

The keten may be collected as such in the gaseous state.

Or, corresponding to what is also indicated in my said specification, the keten may be used to form acetic acid, especially glacial or concentrated acetic acid, or acetic anhydride or mixture thereof or of one or both of them with keten, by absorption or treatment of the keten, or of the reaction vapors containing it, with appropriate quantities of water or acetic acid, preferably after first freeing the reaction vapors from unconverted aldehyde. For such absorption or treatment the water or acetic acid may be employed in the liquid state or as steam or vapor. Mixtures of water and acetic acid in liquid or vapor form may likewise be employed. According to the relative quantity of water introduced into the reaction gases or keten or used for absorbing the same, acetic acid, acetic anhydride or mixtures thereof or mixtures of one or both of them with keten will result. Thus if one molecule of water is employed relatively to two molecules of keten, acetic anhydride results, whilst if two molecules of water are employed relatively to two molecules of keten, acetic acid results. Similarly if acetic acid vapor is introduced into the reaction gases or keten or if acetic acid is used for absorbing the same, acetic anhydride or mixtures thereof with acetic acid or mixtures of either or both of them with keten may result according to the relative proportions of acetic acid employed, while if water is present in sufficient quantity in the acetic acid employed, actic acid may also be formed. Where water is employed for the treatment or absorption or is present in the acetic acid employed therefor, it should preferably be only in restricted quantities insufficient to result in the production of acetic acid of low concentration, unless it is desired to obtain a lower concentration intentionally.

According to another way of obtaining acetic anhydride or acetic acid or mixtures thereof from the acetaldehyde produced from the dilute or waste acetic acid as before referred to, I may, similarly to what is likewise indicated in my said other specification, mix water vapor or acetic acid vapor, or both vapors, with the acetaldehyde vapor, and by subjecting the mixed vapors with or without pressure to the action of heat in presence or absence of hydrogen splitting catalysts in an analogous manner to what is above indicated, I may obtain acetic acid or acetic anhydride or mixtures thereof or mixtures of either or both of them with keten, the aldehyde being first decomposed to form keten which immediately combines with the water or acetic acid to form acetic acid or acetic anhydride. In such cases water should only be employed or present in restricted quantities insufficient to result in the production of acetic acid of low or relatively low concentration, unless it is desired to obtain lower concentrations intentionally.

The reaction may be performed under similar conditions of temperature to those for the production of keten as above referred to and similar catalysts may be employed.

The hydrogen split off during the transformation of acetaldehyde into keten or (via intermediately formed keten) into acetic anhydride or/and acetic acid in any of the forms of process above described can be collected separately and used as reducing gas for transforming the dilute or waste acetic acid into acetaldehyde.

The term "concentrated" is used in the appended claims to include both concentrated and anhydrous substances.

What I claim and desire to secure by Letters Patent is:

1. A process of manufacturing concentrated products from dilute acetic acid, which comprises subjecting the dilute acetic acid to a reduction process whereby the acetic acid content is converted into acetaldehyde, separating the acetaldehyde in a concentrated state from the resulting aqueous mixture, and converting the acetaldehyde into concentrated acetic acid.

2. A process of manufacturing concentrated products from dilute acetic acid, which comprises subjecting the dilute acetic acid to a reduction process whereby the acetic acid content is converted into acetaldehyde, separating the acetaldehyde in a concentrated state from the resulting aqueous mixture, and oxidizing the acetaldehyde to form concentrated acetic acid.

3. A process of manufacturing concentrated products from dilute acetic acid, which comprises vaporizing the dilute acetic acid, subjecting the mixture of acetic acid vapor and steam so produced to the action of reducing gases in the presence of a catalyst, treating the resulting mixture containing acetaldehyde and water to separate the acetaldehyde in concentrated state, and oxidizing the acetaldehyde to form concentrated acetic acid.

4. A process of manufacturing concentrated products from dilute acetic acid, which comprises vaporizing the dilute acetic acid, subjecting the mixture of acetic acid vapor and steam so produced to the reducing action of a gas containing hydrogen in the presence of a metallic catalyst capable of promoting hydrogenation, treating the resulting mixture containing acetaldehyde and water to separate the acetaldehyde in concentrated state, and oxidizing the acetaldehyde to form concentrated acetic acid.

5. A process of manufacturing concentrated products from dilute acetic acid, which comprises vaporizing the dilute acetic acid, subjecting the mixture of acetic acid vapor and steam so produced to the action of a gas containing hydrogen in the presence of nickel at a temperature between $100°$ and $400°$ C., fractionally condensing the resulting vapor mixture containing acetaldehyde and water to produce acetaldehyde in concentrated state, and oxidizing the acetaldehyde to form concentrated acetic acid.

In testimony whereof I have hereunto subscribed my name.

HENRY DREYFUS.